United States Patent [19]
Atkin et al.

[11] Patent Number: 5,907,326
[45] Date of Patent: May 25, 1999

[54] SYSTEM AND METHOD FOR UPDATING CULTURAL PROFILES WITH DRAGGING AND DROPPING LOCALE OBJECTS

[75] Inventors: Steven Edward Atkin; Kenneth Wayne Borgendale; John D. Howard, all of Austin, Tex.

[73] Assignee: International Business Machines Corporation, Armonk, N.Y.

[21] Appl. No.: 08/813,402

[22] Filed: Mar. 10, 1997

[51] Int. Cl.⁶ .................................................. G06F 3/00
[52] U.S. Cl. ............................... 345/334; 345/348; 704/8
[58] Field of Search .................................. 345/326–358; 704/8

[56] References Cited

U.S. PATENT DOCUMENTS

| | | | |
|---|---|---|---|
| 4,937,760 | 6/1990 | Beitel et al. | 364/513 |
| 5,251,130 | 10/1993 | Andrews et al. | 704/8 |
| 5,416,903 | 5/1995 | Malcolm | 345/333 |
| 5,434,776 | 7/1995 | Jain | 704/8 |
| 5,450,538 | 9/1995 | Glaser et al. | 345/333 |
| 5,499,335 | 3/1996 | Silver et al. | 704/8 |
| 5,513,342 | 4/1996 | Leong et al. | 345/333 |
| 5,526,268 | 6/1996 | Tkacs | 364/419 |
| 5,546,521 | 8/1996 | Martinez | 395/155 |
| 5,564,050 | 10/1996 | Barber et al. | 395/600 |
| 5,583,761 | 12/1996 | Chou | 395/798 |
| 5,583,981 | 12/1996 | Pleyer | 345/333 |
| 5,596,690 | 1/1997 | Stone et al. | 395/133 |
| 5,603,031 | 2/1997 | White et al. | 395/683 |
| 5,659,337 | 8/1997 | Tananaka et al. | 704/8 |
| 5,664,206 | 9/1997 | Murow et al. | 704/8 |
| 5,671,378 | 9/1997 | Acker et al. | 345/334 |
| 5,675,818 | 10/1997 | Kennedy | 704/8 |
| 5,678,039 | 10/1997 | Hinks et al. | 704/8 |

OTHER PUBLICATIONS

Cowart, "Mastering WINDOWS 3.1", Sybex, pp. 175–177, 1993.
"Language Flag Icon," *Research Disclosure* No. 34026, Aug. 1992.
"Specification of Default Formatting Information in a Computer Application Profile," *IBM Technical Disclosure Bulletin*, vol. 32, No. 3A, pp. 210–211, Aug. 1989.
"Keyboard Language Status Icon," *Research Disclosure* No. 34697, Feb. 1993.
"LAN Server Generic Alert Definition Keywords," *IBM Technical Disclosure Bulletin*, vol. 37, No. 09, pp. 185–191, Sep. 1993.
"Traveling User Client Profile," *IBM Technical Disclosure Bulletin*, vol. 37, No. 3, pp. 167, Mar. 1994.
"Subobjects and Enhanced Object Context Sensitivity," *IBM Technical Disclosure Bulletin*, vol. 37, No. 10, pp. 279–280, Oct. 1994.
"Installable Actions and Profiles," *IBM Technical Disclosure Bulletin*, vol. 38, No. 05, pp. 547–553, May 1995.
"Setting Default Internationalization Values when No Values are Available," *IBM Technical Disclosure Bulletin*, vol. 39, No. 7, pp. 245–247, Jul. 1996.

*Primary Examiner*—John E. Breene
*Attorney, Agent, or Firm*—Leslie A. Van Leevwen; Jeffrey S. LaBaw

[57] ABSTRACT

The present invention is directed to a system and method of changing a cultural profile of a program, or application, while the program is executing in an information handling system. The system and method of the present invention enable programs to be globalized/localized to support many different countries and cultures. A user may dynamically change a program's cultural profile to a different cultural profile without having to reboot the system. The profile change may be accomplished through the use of a drag and drop interface. Different aspects, or windows, within a program may utilize different cultural profiles, and a cultural profile change to one aspect, or window, of the program does not affect the other aspects of the program. The present invention allows programs to be customized to support any culture or combination of cultures. This is accomplished through the use of a drag and drop interface, where cultural profiles, referred to as locale objects, are dropped onto windows within a program. When a locale object is dropped on a window, a message is sent to the window, and the window then updates its cultural profile information accordingly.

27 Claims, 5 Drawing Sheets

SYSTEM AND METHOD FOR UPDATING CULTURAL PROFILES WITH DRAGGING AND DROPPING LOCALE OBJECTS

CROSS-REFERENCE TO RELATED APPLICATIONS

The subject matter of this application is related to application Ser. No. 08/519,331 for "Dynamic Object-Oriented Extended Locale Object," filed on Aug. 25, 1995, abandoned Mar. 1, 1998, application Ser. No. 08/519,491 for "Dynamic Object-Oriented Extended Customization Object," filed on Aug. 25, 1995, abandoned Mar. 1, 1998, application Ser. No. 08/573,016 for "Graphical Locale Object Builder," filed on Dec. 15, 1995, abandoned Mar. 1, 1998, and co-pending application Ser. No. 08/813,401 entitled "System and Method for Managing Multiple Cultural Profiles in an Information Handling System," filed concurrently with this application. The foregoing applications are assigned to a common assignee with this application, and are incorporated herein by reference.

FIELD OF THE INVENTION

The present invention relates to the field of information handling systems and, more particularly, to a system and method for managing program profile information in an information handling system.

BACKGROUND OF THE INVENTION

Software products must be flexible to adapt to the needs of the user. Software products developed in one country that seek an international presence must be modified to fit the needs of markets in other countries. For example, spreadsheets are used in many disciplines by users all over the world, but many spreadsheet programs are developed using underlying assumptions (i.e. monetary symbols, fractional representations) based on the country in which the program is developed. In order for a user in another country to use the spreadsheet program, the user must spend many hours customizing the program to meet her particular needs. Another example of programs that are typically culture-specific are help programs. Modifying a help program to be responsive to the needs of a user in another country involves much more than simply translating error messages.

Internationalization is the process of removing language and cultural dependencies from software applications. Localization is the process of reinserting a specific set of values for the language and cultural attributes removed during internationalization. Developers must be aware of the cultural dependencies in localizing their applications. How well a developer internationalizes and localizes its application may be the single biggest factor in determining the success or failure of an organization's products in other countries.

One issue involved in internationalizing and localizing an application is language translation. When translating an application, developers must be concerned with the accuracy of the translation, the introduction of defects during the translation process (i.e. the introduction of defects into an application that were not previously present), and maintenance for every translated version of the application.

However, language translation of applications alone is not enough to make an application internationalized. User interfaces are highly graphical and contain more than simple text strings. Graphical user interface systems have made applications easy to use, but have also made these same applications highly culturally dependent. For example, the color red may indicate "stop" or "warning" in one culture, and have an entirely different meaning, such as "go," in another culture. Thus, an application which uses a red icon as a warning flag, may need to use a different color icon in a different country.

The process of localizing an application for a different country or culture is simply too complex and time-consuming to do individually for each culture. What is needed is a process for simultaneously developing software for all cultural markets. It is important that this process remain consistent with modern software engineering standards for it to be effective. The internationalization process must be capable of being incorporated into current software development methodologies, such as object oriented development and functional decomposition.

Several prior art attempts have been made to arrive at a standardized procedure for solving internationalization issues. For example, one type of international product model enables all groups involved in internationalization to share a common understanding of the components that make up an international product. These components include an international base component, a user interface component, a market specific component and a country specific information component. The international base component contains an application's basic functional code, such as executable images, internal data files, and command procedures without text. The user interface component is language specific and is localized to meet the cultural requirements of the specific group of users. The market specific component meets the special requirements of a specific region and provides enhancement only. The country specific information component is a set of required documentation needed to meet regulations for selling a product in a specific country. One disadvantage of this prior art approach is that it places a large burden of internationalization/localization on local programmers and translators, rather than providing localized interfaces inside of the base operating system. This methodology requires that multiple translations be done for similar information by programmers writing applications for the same operating system.

Another approach is to use national language support (NLS), which provides developers with a library to aid in the internationalization/localization process. NLS includes a set of routines to replace the standard program libraries, along with a set of tools to assist in the construction of message catalogs and local databases. Message catalogs contain textual information that an application might require during localization. These catalogs are then further broken down into sets for ease of interaction. Applications make a request to the NLS system at run time. The NLS then returns a particular word or phrase in the current language. The disadvantage of this approach is that NLS applications require mapping of standard routines into NLS routines, and generation extraction of the messages catalogs. In addition, the NLS approach only allows for the localization of textual and numeric information. It does not handle graphical or auditory information.

A similar prior art NLS approach is used in windows-type systems, such as Microsoft Windows (Microsoft Windows is a trademark of Microsoft Corporation). To help facilitate internationalization/localization in a windows environment, the window subsystem provides NLS application programmer interfaces (APIs), which give applications access to culturally correct string comparisons, collation tables for sorting different languages, date, time, and currency formatting functions, and functions to determine which locale is in effect and which other locales are present on the system. In a properly enabled window program, NLS must be isolated from other parts of an application. NLS function calls must be provided at all points where language dependent operations are required. Unfortunately, the windows application in internationalization/localization also only allows for the localization of textual and numeric information. It does not handle graphical or auditory information.

Another approach is used in the OS/2 operating system (OS/2 is a trademark of International Business Machines Corporation). The OS/2 NLS approach consists of two phases, the first being function development and the second being translation. Function development allows a programmer to work in a standard language, such as double byte character set (DBCS) or Unicode characters having Unicode functions. However, the current approach in OS/2 is limited in that it urges programmers to separate localizable information into resource files. This means that localization teams must then repeatedly translate similar material, rather than having it be part of the base operating system.

Currently, there exists a notion of a locale object. Note that the locale object as it exists in the prior art is not a true object, because it does not encapsulate localization data with the operations that work on the data. The locale object contains support for formatting of time, date and currency information along with support for collation of strings. However, the prior art type of locale object is not readily extendable to allow for the addition of new cultural attributes. Prior art locale objects do not support graphical localization information such as icons, dialogues, menus, and colors, and also do not support sound localization information such as warning, success, and failure beeps. Moreover, prior art locale objects do not support textual localization information such as warning, success, and failure messages.

Finally, prior art locale objects do not allow an application to be configured in such a manner as to allow the application to utilize context sensitive cultural profiles. In other words, prior art locale objects force an entire application to use the same cultural profile for all aspects of the application. This means that an application can not have an interaction cultural profile (i.e. toolbar, commands, etc.) which is separate and distinct from its data cultural profile (i.e. data formats, date formats, paper size, currency and numeric formats, etc.). Furthermore, in an application which contains more than one window, every window of the application must use the same cultural profile. This is a distinct drawback of prior art locale objects. A user in one country often has a need, for example to write a letter or construct a spreadsheet, for a user in another country. For example, suppose a Japanese company wishes to propose a joint manufacturing venture to a German company. The users putting the proposal together will prefer to work using a Japanese interaction cultural profile. This means that menu bars, icons, titles, etc. will all be configured for a Japanese user. However, the letters to the German company should be written in German, and the spreadsheets used to show financial effects should show currency amounts in marks, rather than yen. Prior art locale objects require that the interaction cultural profile and the data cultural profile be the same.

Consequently, there is a need for a system and method which allows users of an information handling system to have access to separate and unique cultural profiles at application run-time. It would be desirable to allow an application to use different cultural profiles in different contexts. Additionally, it would be desirable to enable cultural profiles of an application to be dynamically changed while the application is running.

SUMMARY OF THE INVENTION

Accordingly, the present invention is directed to a system and method of changing a cultural profile of a program, or application, while the program is executing in an information handling system. The system and method of the present invention enable programs to be globalized/localized to support many different countries and cultures. A user may dynamically change a program's cultural profile to a different cultural profile without having to reboot the system.

One advantage of the present invention is that the profile change may be accomplished through the use of a drag and drop interface. Another advantage of the present invention is that different aspects, or windows, within a program may utilize different cultural profiles, and a cultural profile change to one aspect, or window, of the program does not affect the other aspects of the program. For example, the interaction portion of a program, such as toolbars and menus, may use a different cultural profile than the cultural profile used by the data portion of a program. Even within the interaction portion of a program, each window may use a different cultural profile. Thus a user may use a toolbar with one cultural profile, a menu with another cultural profile, and auditory signals (i.e. warning beeps) with yet another cultural profile.

The present invention allows programs to be customized to support any culture or combination of cultures. This is accomplished through the use of a drag and drop interface, where cultural profiles, referred to as locale objects, are dropped onto windows within a program. When a locale object is dropped on a window, a message is sent to the window, and the window then updates its cultural profile information accordingly.

One of the embodiments of the invention is as sets of instructions resident in an information handling system.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, where like reference numerals are used to identify like parts in the various views and in which.

DETAILED DESCRIPTION OF THE PREFERRED EMBODIMENT

Figure 1:
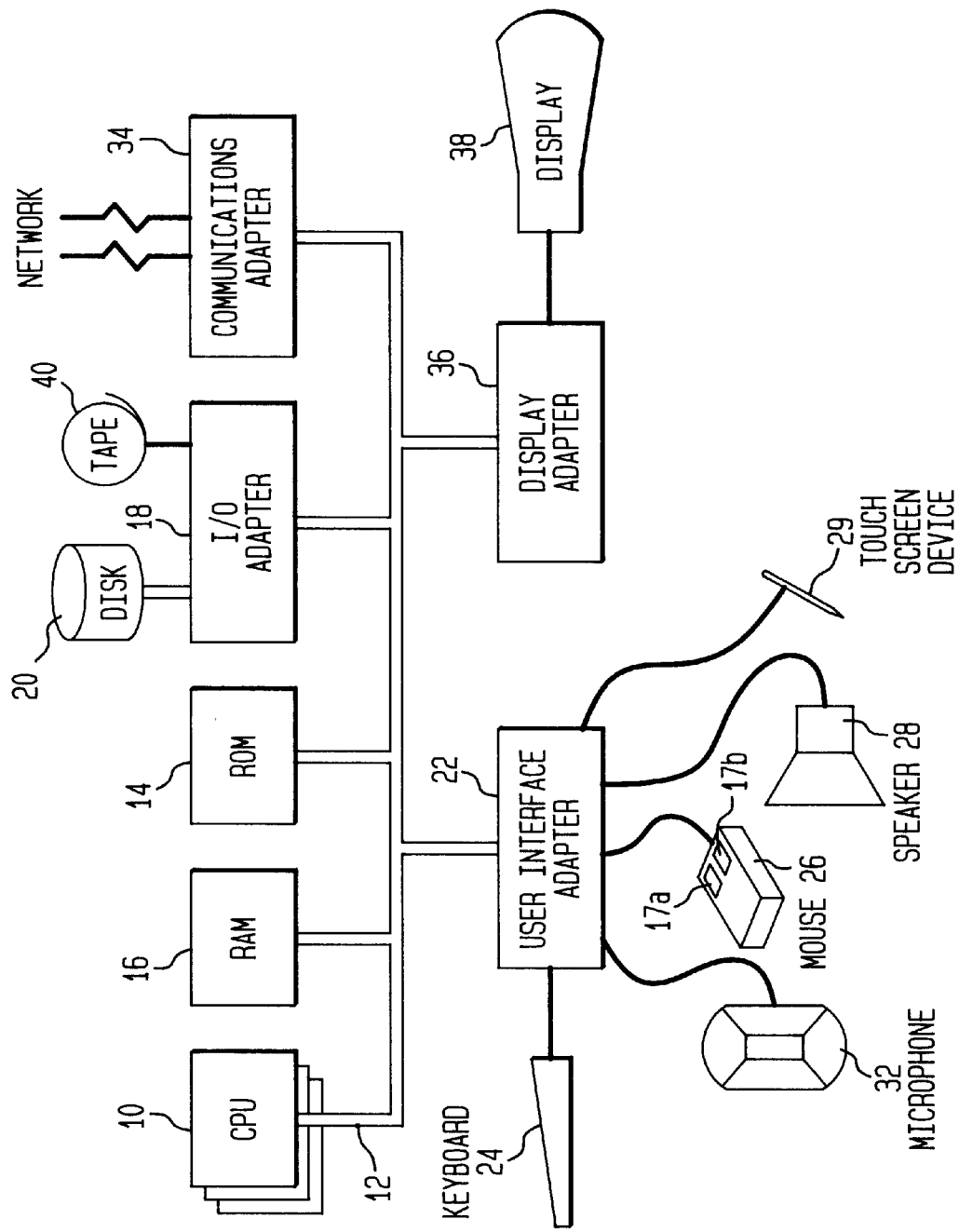
FIG. 1 is a block diagram of an information handling system capable of executing the context sensitive locale system of the present invention.

The invention may be implemented on a variety of hardware platforms, including personal computers, workstations, minicomputers, and mainframe computers. Many of the steps of the method according to the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20 and tape drives 40 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

Object oriented programming has established itself as an important methodology in developing high quality, readable code that executes on systems, such as the information handling system depicted in FIG. 1. The present invention includes a dynamic, object-oriented locale object that expands the currently defined notion of a locale by encapsulating localization information and localization procedures into a cohesive unit, thereby enabling an application to be internationalized. The locale object is then extended to allow for different cultural attributes, such as color, icons, dialogues, and menus. To further enhance the functionality of the extended locale object, the locale object also allows domain or application specific localization information to be contained therein. The language used to implement the present invention is primarily C++ for OS/2, and the concepts of software programming, especially in object-oriented programming, are detailed in U.S. Pat. No. 5,361,350, entitled "Object Oriented Method Management System and Software for Managing Class Method Names in a Computer System," commonly assigned to the Assignee of the present invention and herein incorporated by reference for all purposes.

The operating system provides a domain customization object, such as an extended locale object used in internationalization/localization, that can dynamically change during the execution of an application, along with a mechanism for effecting locale changes at run time. The customization object contains the information necessary to effect the customization. For example, the international domain customization object enables the operating system to return an extended locale object describing the current application's international settings upon a request for the extended locale object. For illustrative purposes, the extended locale object used for internationalization/localization will now be described.

Upon user request through an application, the extended locale object provides the following localization information, for example:

Day: a string containing the name of a day, given a particular day of the week.

Month: a string containing the name of a month, given a particular month of the year.

Date: a formatted string containing a date, given a particular day, month, and year.

Time: a formatted string, containing a time, given hours, minutes, and seconds.

Currency symbol: a string containing the international currency identifier for the current locale.

Decimal: a string containing the symbol used to separate fractional quantities from whole quantities in the current locale.

Thousands: a string containing the symbol used to separate multiples of 1,000.

Sign: a string containing the symbol used to represent positive and negative quantities for the current locale. Fractional quantities: a number representing the number of digits to display after the decimal point in monetary quantities.

Menu: a translated common user access (CUA) menu bar, when given a request for a standard menu bar.

Dialogue: a localized dialogue box containing an icon and color appropriate for the type of dialogue and current locale, given a specific request for a CUA dialogue box.

String: a translated string based upon the current locale, when given a specific request for a pre-defined operating system string.

Locale changes are performed through the use of a customization change daemon, also referred to as a locale change daemon. Note that a daemon is a program that lies dormant, waiting for a condition or conditions to occur. Upon the occurrence of a particular condition or conditions, the daemon wakes up, performs a particular task, and then becomes dormant again.

In the present invention, the locale change daemon takes the form of a drag and drop presentation manager application. The locale change daemon stays suspended until a user clicks on it with a mouse operation. When the daemon is invoked, a locale change may take place by simply dragging a locale change object and dropping it on top of an application. The locale change is context sensitive. This means that if the locale change object is dropped onto the presentation space of the application, the data cultural profile for the application is changed to reflect the new cultural profile for the application's working data. If, on the other hand, the locale change object is dropped anywhere else on the application, the application's interaction cultural profile is changed to reflect the new cultural profile for the application. A context sensitive locale change allows a user to interact with the application using one cultural profile, while working with data using a different cultural profile. For example, a user can work with a spreadsheet using an Arabic toolbar, commands, etc., while the spreadsheet actually contains Japanese currency.

In addition to allowing the interaction cultural profile to differ from the data cultural profile, the system and method of the present invention allow different windows, within a multi-window application, to use different cultural profiles. In the example above, the user can work with a spreadsheet that has an Arabic interaction cultural profile and a Japanese data cultural profile. In addition, the user may wish help windows within the spreadsheet application to use French language (i.e. a French data cultural profile) with a Mexican toolbar (i.e. a Mexican interaction cultural profile).

Figure 2:
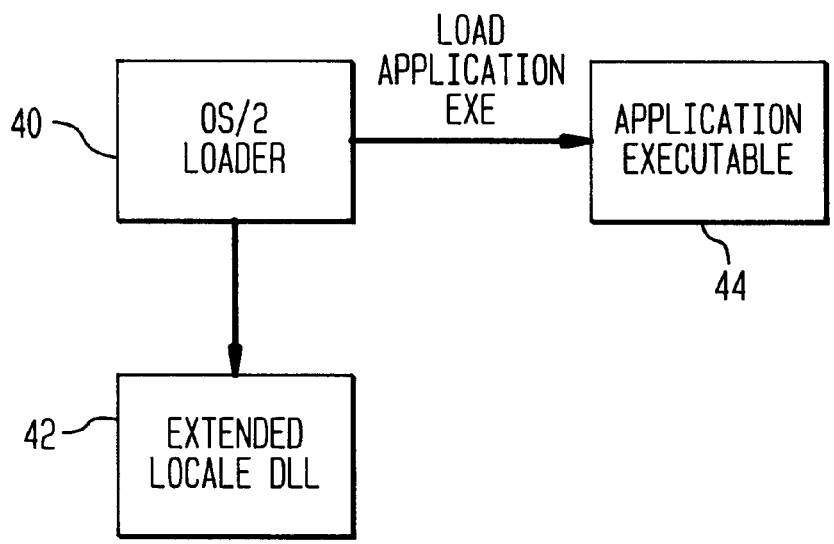
FIG. 2 is a block diagram depicting an application start-up according to the present invention.
Figure 3:
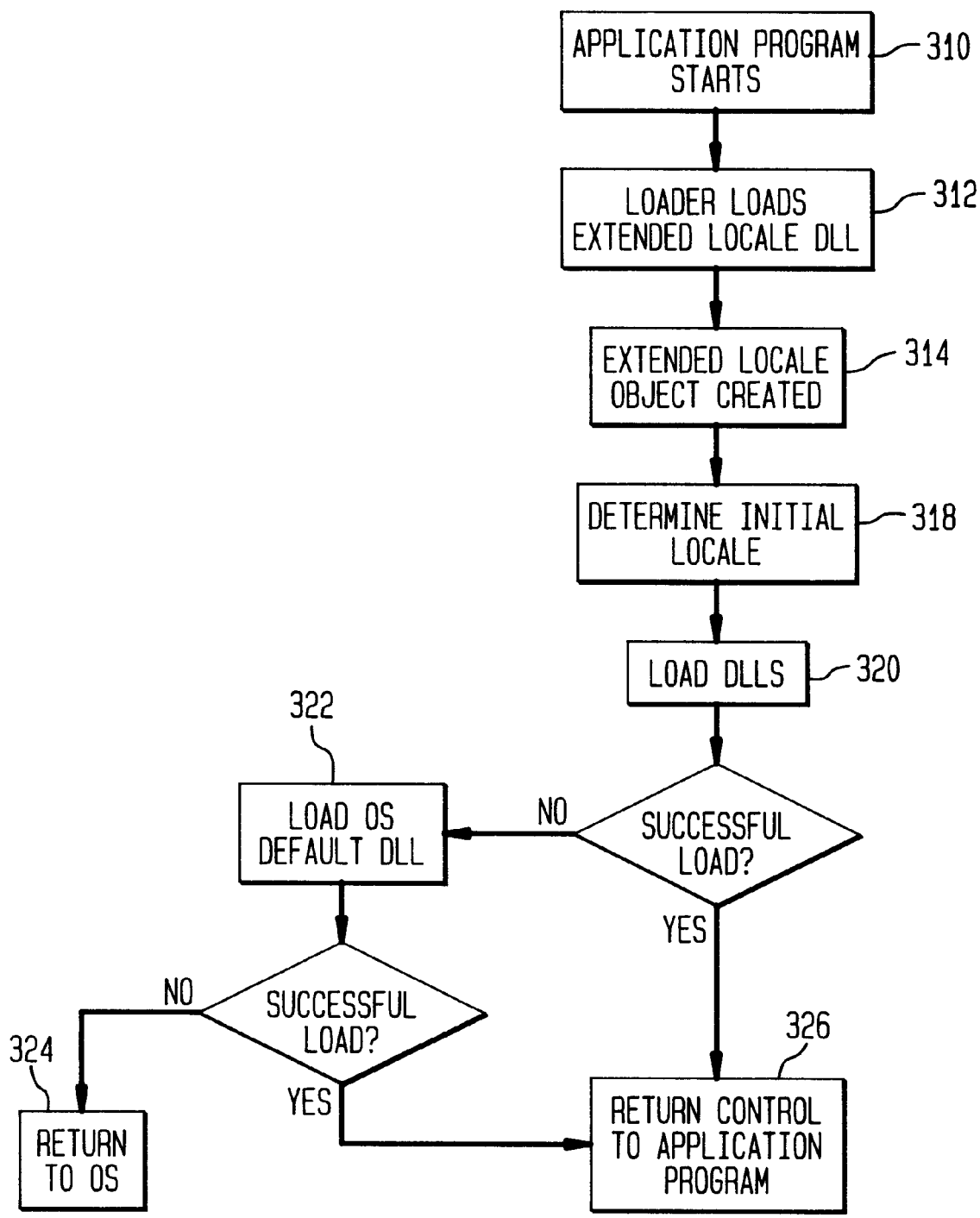
FIG. 3 is a flow chart illustrating a method for starting an application according to the teachings of the present invention.

Referring now to FIG. 2, a block diagram representing an application start-up will be described. A flow chart depicting the method of the present invention is illustrated in FIG. 3, and will also be described. When an application 44 starts execution (step 310), loader 40 attempts to load extended locale DLL 42 (step 312), which contains the object code for the extended locale object. If the load is successful, extended locale object 48 is created (step 314).

After extended locale object 48 is created, it then examines an environment variable, referred to as LOCALE, in order to determine the initial locale (step 318). This environment variable is set to a default value, such as USA, by the operating system. The environment variable may be changed to any default value by simply typing "SET LOCALE value" at any operating system prompt, where "value" is any supported locale. This allows the system to have multiple operating system sessions running concurrently, with different values for each initial start up locale.

After extended locale object 48 has determined the appropriate starting locale, it attempts to load all necessary DLLs required to support the requested locale (step 320). If, during this load process, extended locale object 48 determines that it cannot support the requested locale, or that it cannot load all the required DLLs, it then attempts to load the operating system defined default locale (step 322). Note that the operating system defined default locale may be different than the user requested default locale issued at an operating system prompt. This is done to help insure that an application always starts, regardless of what the requested default locale may be. If a failure occurs at this level, extended locale object 48 interprets this as a catastrophic operating system failure and then halts all execution of application 44, destroys itself, and returns control back to the current operating system session (step 324).

Once extended locale object 48 has successfully loaded all required resources, control is then returned to application 44 (step 326). Next, a localization information request is performed. If, during execution, application 44 finds itself needing any operating system defined localization information, it simply sends a request message to extended locale object 48 for the information.

Figure 4:
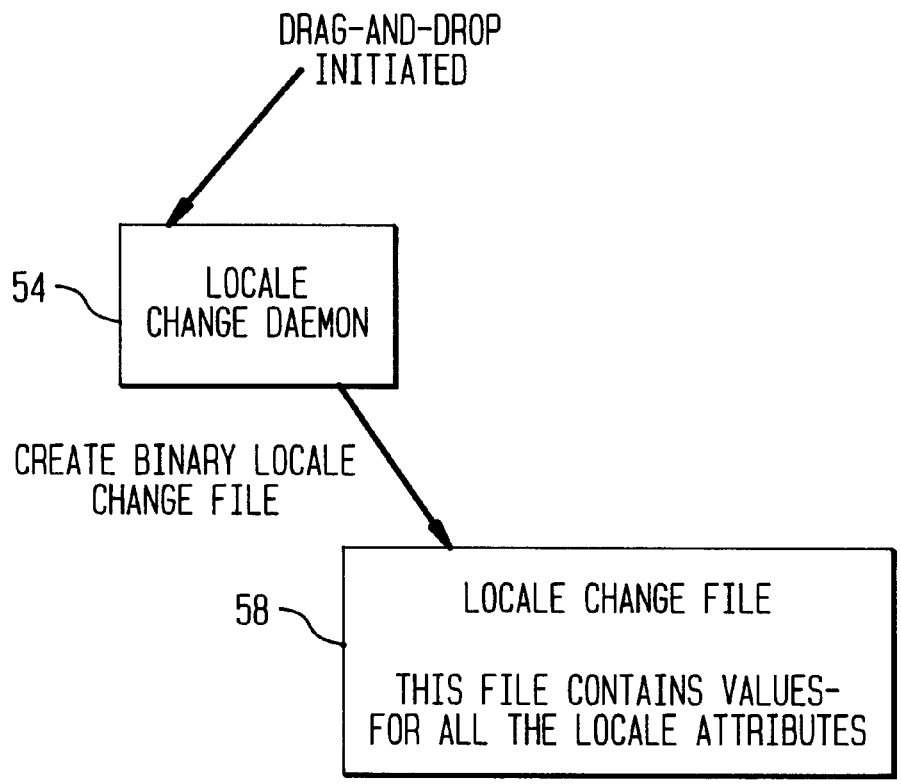
FIG. 4 is a block diagram representing the implementation of the drag and drop initialization using a local change demon.

During the execution of application 44, the user can request that application 44 change locales. This change takes place by using the locale change daemon application. FIG. 4 is a block diagram representing the implementation of the drag and drop initialization using locale change daemon 54. Locale change daemon 54 communicates with application 44 by using a drag and drop facility.

To start a locale change, a user simply drags an icon flag from locale change daemon 54 and drops it on an application 44. When a drag-drop is initiated, locale change daemon 54 creates a binary file, and places the locale change information in this binary file, or locale change file, 58. When the drop takes place, application 44 retrieves the name of locale change file 58. Further details regarding this process are discussed below. Application 44 then reads file 58 and sends a message to extended locale object 48 telling it to change to a new locale Set locale.

Figure 5:
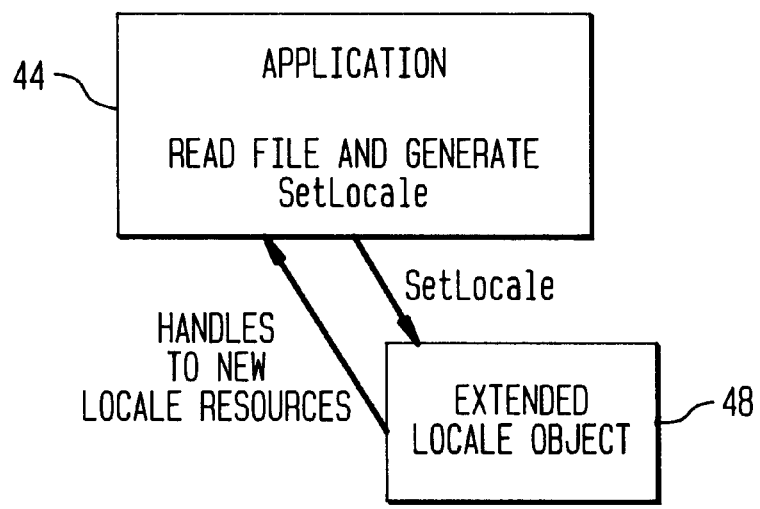
FIG. 5 is a block diagram showing the application locale change of the present invention.
Figure 6:
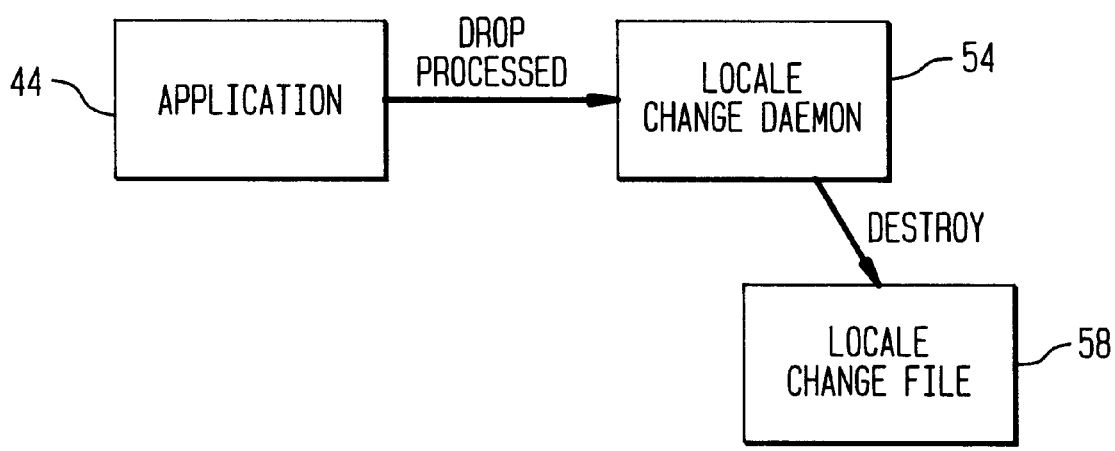
FIG. 6 is a block diagram depicting a drop being processed according to the present invention.

FIG. 5 is a block diagram illustrating the application locale change in block diagram form. As shown in FIG. 5, application 44 reads the locale change file, and sends a message to extended locale object 48 telling it to change to a new locale. Extended locale object 48 returns a handle to the new locale resources. Next, as shown in FIG. 6, the drop is processed. When application 44 finishes reading locale change file 58, it signals to locale change daemon 54 that the drop has been processed. Locale change daemon then destroys locale change file 58.

Figure 7:
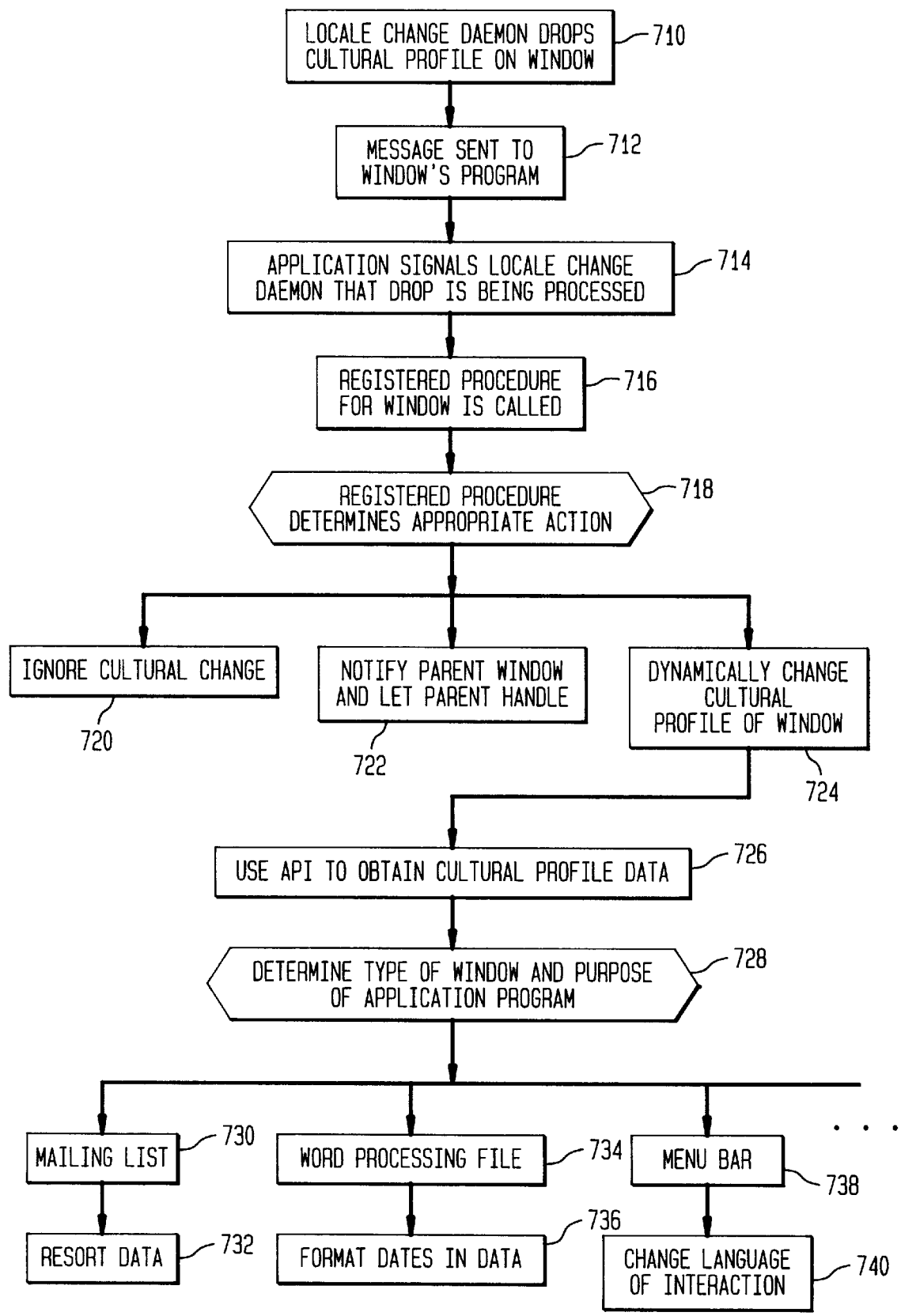
FIG. 7 is a flow chart illustrating a method of changing the locale of a window according to the teachings of the present invention.

The system and method of the present invention enable a user to perform a context sensitive profile change. This is illustrated in FIG. 7. Locale change daemon 54 can drop a cultural profile on any window within an application. It is important to note that each window typically consists of many other windows. For example, in OS/2, the toolbar is considered a window. Help screens are also considered windows. The toolbar and the help screens are windows within a larger window. Although the described embodiment is discussed in terms of OS/2, the invention is not limited to any particular operating system.

Referring now to FIG. 7, when—therefor locale change daemon 54 drops a cultural profile (i.e. a flag icon) on a window (step 710), a message is sent (this is also referred to as posting an event) from the graphical locale change daemon (which is part of the operating system) to the program (step 712). The message sent is referred to as wm_localechange. One of the parameters sent with this message is the name of the cultural profile, or locale object, that was dropped on the window. The application then signals the graphical locale change daemon that the drop is processed (step 714), and proceeds to handle the drop.

The application handles the drop by processing the wm_localechange message. This is accomplished through the use of a procedure which is registered to handle messages (i.e. events) for the window on which the cultural profile was dropped (step 716). The registered procedure recognizes the message and takes an appropriate course of action (step 718).

There are several things the registered procedure can do at this point. The procedure may decide to ignore the cultural profile change (step 720). This could occur if the window was programmed, for some reason, to not allow cultural profile changes. The procedure may notify a parent window of the event (step 722), and let the parent window then handle the event. The procedure may also choose to dynamically change the cultural profile of the window (step 824).

To dynamically change the cultural profile of the window, the procedure uses a system API with the cultural profile as one of the API's parameters. The API returns a pointer to the cultural profile data (step 726). At this point, the procedure's actions depend on the type of window on to which the cultural profile was dropped, and the purpose of the application program (step 728). For example, if the cultural profile was dropped onto a mailing list of names, the appropriate action may be to resort the list according to the collation rules of the new cultural profile (step 730 and 732). If the new cultural profile was dropped on a word processing file, the appropriate action may be to format all the dates in the file according to the rules of the new cultural profile (step 734 and 736). If the new cultural profile was dropped on a menu bar, the appropriate action may be to change the language of the menu bar (step 738 and 740).

The system and method of the present invention enable users to take advantage of a context sensitive locale change operation, so that a user may interact with an application using one cultural profile (i.e. an interaction cultural profile, as depicted in steps 738 and 740 of FIG. 7), while working with application data using another cultural profile (i.e. a data cultural profile, as depicted in steps 730, 732 and steps 734, 736 in FIG. 7). In addition, each window within a multi-windowed program may have different cultural and interaction profiles defined. Further, cultural profiles may be dynamically changed while a program is executing, with no need to reboot the system.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. An information handling system, comprising:

one or more processors;

storage means;

input/output means;

display means;

one or more images of an operating system for controlling operation of said processors;

means for executing one or more programs, wherein each program comprises one or more windows; and means for changing a cultural profile of a selected window, wherein said means for changing includes means for dragging and dropping a locale change object on a graphical user interface representation of the selected window.

2. An information handling system according to claim 1, wherein said means for changing further comprises means for changing an interaction cultural profile for the window.

3. An information handling system according to claim 1, wherein said means for changing further comprises means for changing a data cultural profile for the window.

4. An information handling system according to claim 1, wherein said means for changing comprises means for invoking a locale change daemon.

5. An information handling system according to claim 1, wherein said means for changing comprises:

means for dragging and dropping a locale change object on a selected window;

means for sending a message to the program containing the window on which the locale change object was dropped; and means for invoking a registered procedure to handle the message.

6. An information handling system according to claim 5, wherein said means for invoking a registered procedure comprises means for ignoring the message.

7. An information handling system according to claim 5, wherein said means for invoking a registered procedure comprises means for sending the message to a parent window.

8. An information handling system according to claim 5, wherein said means for invoking a registered procedure comprises means for obtaining data regarding the locale object.

9. An information handling system according to claim 8, wherein said means for obtaining data comprises means for invoking an application programming interface to obtain a pointer to a memory area containing the data regarding the locale object.

10. A method of globalizing an information handling system, comprising the steps of:

executing one or more programs, wherein each program comprises one or more windows; and changing a cultural profile of a selected window, wherein said changing step includes the step of dragging and dropping a locale change object on a graphical user interface representation of the selected window.

11. A method according to claim 10, wherein said changing step further comprises the step of changing an interaction cultural profile for the window.

12. A method according to claim 10, wherein said changing step further comprises the step of changing a data cultural profile for the window.

13. A method according to claim 10, wherein said changing step comprises the step of invoking a locale change daemon.

14. A method according to claim 10, wherein said changing step comprises the steps of:

dragging and dropping a locale change object on a selected window;

sending a message to the program containing the window on which the locale change object was dropped; and invoking a registered procedure to handle the message.

15. A method according to claim 14, wherein said invoking step comprises the step of ignoring the message.

16. A method according to claim 14, wherein said invoking step comprises the step of sending the message to a parent window.

17. A method according to claim 14, wherein said invoking step comprises the step of obtaining data regarding the locale object.

18. A method according to claim 17, wherein said obtaining step comprises the step of invoking an application programming interface to obtain a pointer to a memory area containing the data regarding the locale object.

19. A computer-readable medium, comprising:

means for executing one or more programs, wherein each program comprises one or more windows; and means for changing a cultural profile of a selected window, wherein said means for changing includes means for dragging and dropping a locale change object on a graphical user interface representation of the selected window.

20. A computer-readable medium according to claim 19, wherein said means for changing further comprises means for changing an interaction cultural profile for the window.

21. A computer-readable medium according to claim 19, wherein said means for changing further comprises means for changing a data cultural profile for the window.

22. A computer-readable medium according to claim 19, wherein said means for changing comprises means for invoking a locale change daemon.

23. A computer-readable medium according to claim 19, wherein said means for changing comprises:

means for dragging and dropping a locale change object on a selected window;

means for sending a message to the program containing the window on which the locale change object was dropped; and means for invoking a registered procedure to handle the message.

24. A computer-readable medium according to claim 23, wherein said means for invoking a registered procedure comprises means for ignoring the message.

25. A computer-readable medium according to claim 23, wherein said means for invoking a registered procedure comprises means for sending the message to a parent window.

26. A computer-readable medium according to claim 23, wherein said means for invoking a registered procedure comprises means for obtaining data regarding the locale object.

27. A computer-readable medium according to claim 26, wherein said means for obtaining data comprises means for invoking an application programming interface to obtain a pointer to a memory area containing the data regarding the locale object.

* * * * *